United States Patent
Miyasaka et al.

(10) Patent No.: US 6,845,218 B2
(45) Date of Patent: Jan. 18, 2005

(54) INTERCHANGEABLE LENS TYPE CAMERA SYSTEM

(75) Inventors: Tetsuo Miyasaka, Kanagawa (JP); Mamoru Sakashita, Okaya (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/463,112

(22) Filed: Jun. 16, 2003

(65) Prior Publication Data

US 2004/0202464 A1 Oct. 14, 2004

(30) Foreign Application Priority Data

Apr. 8, 2003 (JP) .......................................... 2003-104487
Jun. 11, 2003 (JP) .......................................... 2003-166886

(51) Int. Cl.[7] .............................. G03B 7/26; G03B 17/00
(52) U.S. Cl. ........................ 396/301; 396/529; 396/543
(58) Field of Search .................................. 396/301, 543, 396/529–532

(56) References Cited

U.S. PATENT DOCUMENTS

| | | | |
|---|---|---|---|
| 4,737,812 A | | 4/1988 | Hasegawa et al. |
| 4,782,355 A | * | 11/1988 | Sakai et al. .................... 396/72 |
| 4,814,812 A | * | 3/1989 | Nakajima et al. ............ 396/227 |
| 5,012,264 A | * | 4/1991 | Nagano et al. ............... 396/301 |
| 6,336,754 B1 | | 1/2002 | Sato et al. |
| 6,738,574 B2 | * | 5/2004 | Nishida et al. ................ 396/87 |

FOREIGN PATENT DOCUMENTS

| | | |
|---|---|---|
| JP | 59-048742 A | 3/1984 |
| JP | 62-220937 A | 9/1987 |
| JP | 62-267732 A | 11/1987 |
| JP | 02-149073 A | 6/1990 |
| JP | 04-349415 A | 12/1992 |
| JP | 05-8552 U | 2/1993 |
| JP | 10-003116 A | 1/1998 |
| JP | 11-223865 A | 8/1999 |
| JP | 2000-056375 A | 2/2000 |
| JP | 2002-229116 A | 8/2002 |

* cited by examiner

*Primary Examiner*—W. B. Perkey
(74) *Attorney, Agent, or Firm*—Frishauf, Holtz, Goodman & Chick, P.C.

(57) ABSTRACT

A camera body including a camera CPU, a detection switch and an interchangeable lens having a lens CPU are provided. The detection switch is connected to the camera CPU and is switched in response to the start of the attachment of the interchangeable lens and is switched to a reproducing state in response to the completion of the attachment of the interchangeable lens. In this case, when the interchangeable lens is attached to the camera body, the camera CPU supplies reset signals to the lens CPU in response to the switching of the detection switch. Upon the completion of the attachment of the lens, the camera CPU cancels reset signals in response to the switching of the detection switch to the reproducing state.

14 Claims, 7 Drawing Sheets

INTERCHANGEABLE LENS TYPE CAMERA SYSTEM

CROSS-REFERENCE TO RELATED APPLICATION

This application claims benefit of Japanese Application No. 2003-104487 filed in Japan on Apr. 8, 2003, the contents of which are incorporated by this reference.

BACKGROUND OF THE INVENTION

1. Field of the Invention

The present invention relates to an interchangeable lens type camera system and, in particular, to an interchangeable lens type camera system having a camera body and an interchangeable lens removably attached to the camera body.

2. Description of Related Art

As widely known, a lens interchangeable camera does not have an integral construction in which a shooting lens is fixed to the camera body like a so-called compact camera. A lens interchangeable camera includes a combination of the camera body and one of multiple interchangeable lenses. The matching between the camera body and an interchangeable lens requires special consideration.

For example, in order to prevent wrong operations, power is supplied from a power supply in the camera body side to an electric circuit within an interchangeable lens at a predetermined timing after the completion of the attachment of an interchangeable lens to the camera body. This kind of power supply method is disclosed in Japanese Unexamined Patent Application Publication No. 59-048742 and Japanese Unexamined Patent Application Publication No. 62-267732.

Japanese Unexamined Patent Application Publication No. 59-048742 discloses a camera system in which multiple contact terminals at a mount portion of the camera body and multiple contact terminals at interchangeable lens are facing. In this case, the contact terminals are brought into conduction upon the completion of the lens attachment so that the power supply is turned on. In this construction, power can be easily supplied from the camera body to an interchangeable lens only by attaching the interchangeable lens to the camera body.

Japanese Unexamined Patent Application Publication No. 62-267732 discloses a camera system including a switch of which state changes upon the completion of attachment of an interchangeable lens to a camera body. Under the AND condition between the change in state of the switch and a specific operational state (such as powered-on and pressing of a release button) of the camera body, the supply of power to the interchangeable lens is started. With this construction, power can be selectively supplied from the camera body to the interchangeable lens.

However, in the interchangeable lens type camera system, whether the attached interchangeable lens is correct or not, that is, whether the attached interchangeable lens is guaranteed for correct operations or not must be checked. Sometimes, an interchangeable lens manufactured by one manufacturer may be attached to a camera body manufactured by another manufacturer. Therefore, when a lens is attached to the camera body, and when the lens is not guaranteed by the manufacturer of the camera body, appropriate camera operations may not be performed.

In view of these drawbacks, Japanese Unexamined Patent Application Publication No. 2-149073 discloses a camera system for sending test data from the camera body side to the interchangeable lens side and returning corresponding status information from the interchangeable lens side so as to determine whether the interchangeable lens attached to the camera body side is appropriate or not.

SUMMARY OF THE INVENTION

Briefly, an interchangeable lens type camera system according to the invention includes a camera body and an interchangeable lens. The camera body includes a first CPU for controlling a shooting operation by the camera, an interlocking pin mounted at a camera side mount and moving in interlocking to an operation for attaching the interchangeable lens, and a detection switch connected to the first CPU, switched from a first state to a second state due to the movement of the interlocking pin in response to the start of the attachment of the interchangeable lens and switched back from the second state to the first state in response to the completion of the attachment of the interchangeable lens. The interchangeable lens has a second CPU for controlling lens operations. In this case, the first CPU supplies reset signals to the second CPU in response to the switching of the detection switch from the first state to the second state when the interchangeable lens is attached to the camera body and cancels the reset signals in response to the switching of the detection switch from the second state to the first state.

The above and other objects, features and advantages of the invention will become more clearly understood from the following description referring to the accompanying drawings.

DETAILED DESCRIPTION OF PREFERRED EMBODIMENTS

Embodiments of the invention will be described with reference to drawings.

Figure 1:
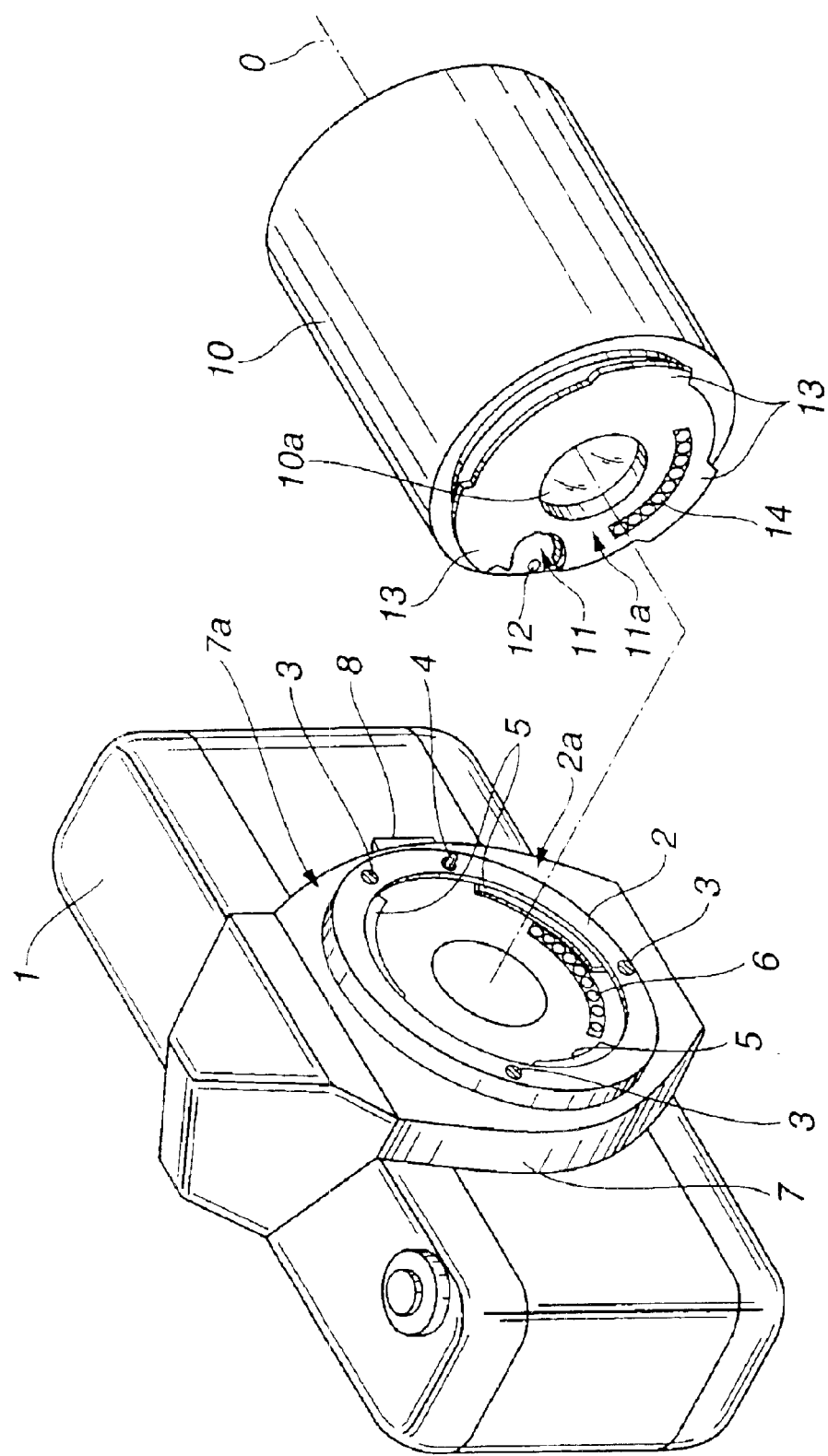
FIG. 1 is a perspective diagram showing a camera body and an interchangeable lens attachable to the camera body in an interchangeable lens type camera system according to an embodiment of the invention.

FIG. 1 is a perspective diagram showing a camera body and an interchangeable lens attachable to the camera body in an interchangeable lens type camera system according to an embodiment of the invention. In the following description, the front side of the lens optical axis O is assumed to be a subject side and the backward side is assumed to be an image-forming plane side. A so-called Bayonet mount is used as a mount to which an interchangeable lens according to the invention is attached.

As shown in FIG. 1, a mount attaching portion 7 to which an interchangeable lens 10 is attached extends forward at the center of the front surface of the camera body 1. A ring-shaped camera side mount portion 2 is fixed to the front surface 7a of the mount attachment 7 with three screws 3. The camera-side mount portion 2 has a mount surface 2a perpendicular to the optical axis O and having horizontal surface.

An interlocking pin 4 extends forward from the right side (in FIG. 1) of the mount surface (called camera side mount surface hereinafter) 2a of the camera side mount portion 2. The interlocking pin 4 is fitted into an engaging hole 12 of the interchangeable lens 10. The interlocking pin 4 is forced by a pressing spring 4a (see FIG. 2) within the mount portion 2.

Three Bayonet nail engaging portions 5 are provided on the internal periphery portion of the camera side mount portion 2 at equal intervals. Three Bayonet nails 13 of the interchangeable lens 10 slidably fit into the three Bayonet nail engaging portions 5. Multiple camera-side terminals 6 (contact terminal means) are provided on a front surface 7a of the mount attachment 7 in an area surrounded by the camera side mount portion 2. The multiple camera-side terminals 6 are in contact with multiple lens-side terminals 14 formed in the interchangeable lens 10. The contact surface of each of the camera-side terminals 6 is semi-circular and extends forward. (Deleted here)

An attachment release button 8 for the interchangeable lens 10 is provided on the right side surface of the mount attachment 7. When the interchangeable lens 10 is removed, the release button 8 separates the interlocking pin 4, which extends forward in the engaging hole 12 of the interchangeable lens 10 when the interchangeable lens 10 is attached from the engaging hole 12 of the interchangeable lens 10.

The interchangeable lens 10 has multiple lenses 10a inside. A ring-shaped lens side mount portion 11 is provided at the back end of the interchangeable lens 10. The lens side mount portion 11 has a Bayonet surface 11a abutted with the camera side mount surface 2a and perpendicular to the optical axis O when the interchangeable lens 10 is attached to the camera body 1. On the outer periphery of a Bayonet surface 11a, the three Bayonet nails 13 are provided, being formed in the same plane of the Bayonet surface 11a and extending outward.

In the meantime, on the lens side mount portion 11, the engaging hole 12, into which the interlocking pin 4 fits when the interchangeable lens 10 is attached to the camera body 1, is provided more deeply forward than an amount of the extension of the interlocking pin 4 extending from the camera side mount surface 2a. Furthermore, on the lens side Bayonet surface 11a, the multiple lens side terminals 14 are provided. The multiple lens side terminals 14 are slidably in contact with (connecting to) the multiple camera side terminals 6. The multiple lens side terminals 14 constitute interchangeable lens side terminals and a part of a transmitter according to the invention and are formed such that the multiple lens side terminals 14 and the lens side Bayonet surface 11a are in the same plane.

In order to attach the interchangeable lens 10 to the camera body 1 having the above-described construction, the three Bayonet nails 13 of the interchangeable lens 10 associate with the three Bayonet nail engaging portions 5 of the camera body 1, respectively. Here, the interlocking pin 4 is pressed and is retracted toward the lens side mount portion 11.

Next, the interchangeable lens 10 is rotated around the optical axis O until the interchangeable lens 10 stops in one direction. Then, the interchangeable lens 10 is fixed and is attached at a position where the three Bayonet nails 13 associate with the three Bayonet nail engaging portions 5. During this, the interlocking pin 4 retracts by being pressed against the lens side mount portion 11. After that, the interlocking pin 4 is fitted into the engaging hole 12 at the lens attached position. Upon changing from the state immediately before the interlocking pin 4 is fitted into the engaging hole 12 to the state where the interlocking pin 4 is fitted therein, the multiple camera side terminals 6 on the camera body 1 are properly in contact with the multiple lens side terminals 14 on the interchangeable lens 10. In this way, the interchangeable lens 10 is attached to the camera body 1.

On the other hand, in order to remove the interchangeable lens 10 from the camera body 1, the attachment release button 8 is pressed first. Then, the interlocking pin 4 is moved backward against the elasticity of the pressing spring 4a and is ejected from the engaging hole 12 of the interchangeable lens 10.

Then, the release button 8 is pressed and is rotated in the opposite direction to the direction of the attachment of the interchangeable lens 10. Thus, the three Bayonet nails 13 slide in the three Bayonet nail engaging portions 5 in the opposite direction of the direction of the attachment. Then, the three Bayonet nails 13 are separated from the three-Bayonet nail engaging portions 5. Therefore, when the interchangeable lens 10 is pulled out in the optical axis direction, the attachment to the camera body 1 is released. In this way, the interchangeable lens 10 is removed from the camera body 1.

Figure 2:
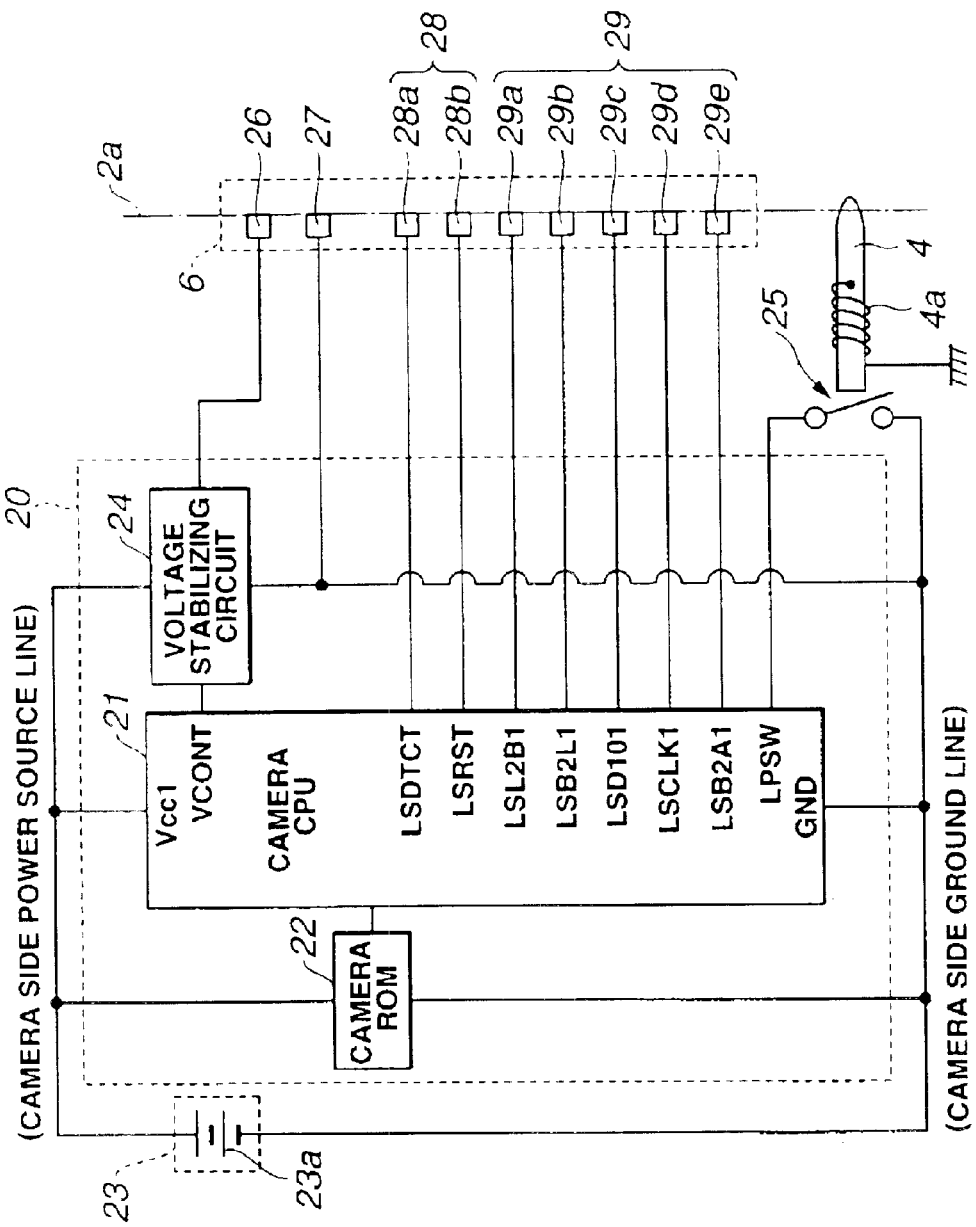
FIG. 2 is a block diagram showing a construction of an electric circuit of the camera body in FIG. 1.

FIG. 2 is a block diagram showing a construction of an electric circuit in the camera body 1 in FIG. 1.

As shown in FIG. 2, the electric circuit of the camera body 1 mainly includes a first electric circuit 20 (first electric circuit means), a power supply circuit 23 (power supply means), a detection switch 25 ((end-of-attachment detecting means), (start-of-attachment detecting means) and (detecting means)), and the camera side terminals 6. The first electric circuit 20 has a camera CPU 21, a camera ROM 22 (first memory means), and a voltage stabilizing circuit 24. The camera CPu 21 is a first CPU for controlling operations of the entire camera 1. The camera ROM 22 is a first memory. The power supply circuit 23 includes a power supply battery 23a or an AC adapter (not shown). The detection switch 25 includes a push switch for detecting the state of the interlocking pin 4 forced by the pressing spring 4a. Further, the CPU 21 includes a checking means, a permitting means, a supply means, a power supply starting means, a releasing means, a reading means, a changing means and a reset means.

The camera CPU 21 has a power supply terminal Vcc1, a voltage-stabilizing circuit control terminal VCONT, a lens detecting terminal LSDTCT (signal input port of the first CPU), a lens reset terminal LSRST (signal output port of the first CPU), a lens CPU start responding terminal LSL2B1, a communication request terminal LSB2L1, a communication data terminal LSDIO1, a communication clock terminal LSCLK1, an adapter communication terminal LSB2A1, a lock pin switch (SW) terminal LPSW and a GND terminal. As described later, the camera CPU 21 further has a timer, not shown, to be used for releasing a reset signal output from the lens reset terminal LSRST to the lens CPU 41 (see FIG. 3) of the interchangeable lens 10.

The camera side terminals 6 include a first power supply terminal 26, a first ground terminal 27, a camera side signal terminal 28, and a camera side communication terminal 29. The first power supply terminal 26 is used for supplying power to the interchangeable lens 10. The camera side signal terminal 28 includes a first signal terminal 28a (first detecting means) for detecting the attachment of the interchangeable lens 10 and a second signal terminal 28b for outputting a reset signal to the lens CPU 41 (see FIG. 3) of the interchangeable lens 10 as described later. The camera side communication terminal 29 includes a first communication terminal 29a, a second communication terminal 29b, a third communication terminal 29c, a fourth communication terminal 29d and a fifth communication terminal 29e and is used for mutual communication between the camera CPU 21 and the lens CPU 41.

The camera ROM 22, camera CPU 21, and voltage stabilizing circuit 24 are connected between the camera side power supply line and camera side ground line of the power supply circuit 23. A fixed terminal of the detection switch 25 is also connected to the camera side ground line.

In the camera CPU 21, the terminal Vcc1 is connected to the camera side power supply line. The terminal VCONT is connected to the input end of the voltage stabilizing circuit 24. The terminal LSDTCT is connected to the first signal terminal 28a. The terminal LSRST is connected to the second signal terminal 28b. The LSL2B1 terminal is connected to the first communication terminal 29a. The LSB2L1 terminal is connected to the second communication terminal 29b. The LSDIO1 terminal is connected to the third communication terminal 29c. The LSCLK1 terminal is connected to the fourth communication terminal 29d. The LSB2A1 terminal is connected to the fifth communication terminal 29e. The LPSW terminal is connected to the detection switch 25. The GND terminal is connected to the camera side ground line.

The camera ROM 22 is connected to the camera CPU 21. The output end of the voltage stabilizing circuit 24 is connected to the first power supply terminal 26. The first ground terminal 27 is connected to the camera side ground line.

The camera ROM 22 may be constituted by a non-volatile memory, for example. As shown in Table 2 described later, the camera ROM 22 stores data for authenticating a manufacturer ID (or manufacturer code) of the interchangeable lens 10. The camera ROM 22 may be provided within the CPU 21.

The voltage stabilizing circuit 24 may be constituted by a DC/DC converter, for example, and is controlled by the VCONT terminal of the CPu 21 to stabilize voltage output from the power supply circuit 23 and supply the stabilized voltage as power supply voltage to the interchangeable lens 10 through the first power supply terminal 26.

When the interchangeable lens 10 is not attached to the camera body 1, the interlocking pin 4 is forced by the pressing spring 4a. As a result, the front end of the interlocking pin 4 extends forward from the camera side mount surface 2a and the back end is positioned apart forward from the detection switch 25. Here, the push switch of the detection switch 25 is at OFF state, which is a first state according to the invention.

Figure 3:
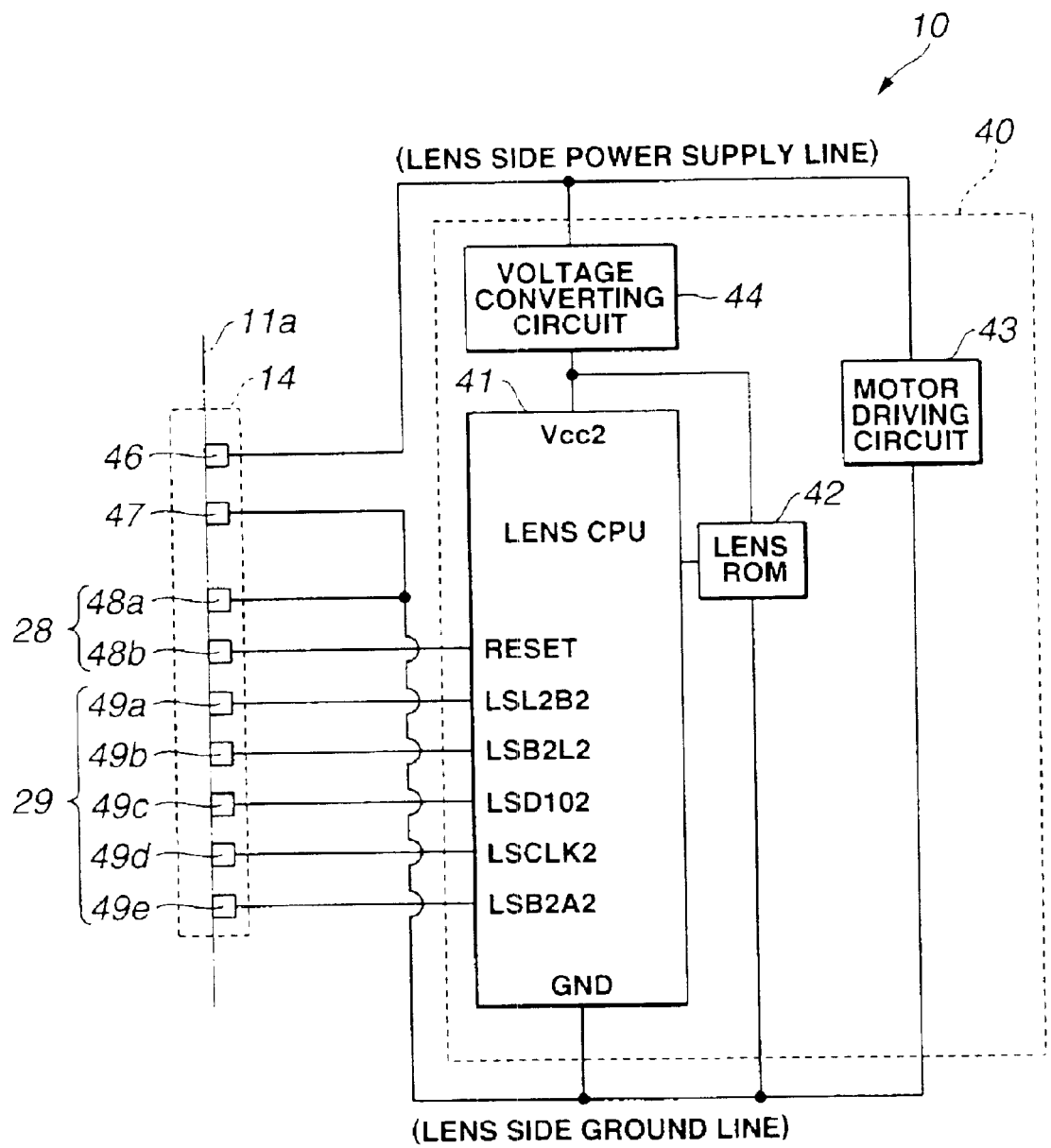
FIG. 3 is a block diagram showing an electric circuit of the interchangeable lens in FIG. 1.

FIG. 3 is a block diagram showing a construction of an electric circuit of the interchangeable lens 10 in FIG. 1.

As shown in FIG. 3, the electric circuit of the interchangeable lens 10 mainly includes a second electric circuit 40 (second electric circuit means). The second electric circuit 40 has a lens CPU 41 (reading means), a lens ROM 42 (second memory means), a motor driving circuit 43 and a voltage converting circuit 44. The lens CPU 41 is a second CPU for controlling operations of the entire interchangeable lens 10. The lens ROM 42 is a second memory.

The lens CPU 41 has a power supply terminal Vcc2, a reset terminal RESET, a start-of-lens-CPU output terminal LSL2B2, a communication output terminal LSB2L2, a communication data terminal LSDIO2, a communication clock terminal LSCLK2, an adapter communication terminal LSB2A2 and a GND terminal.

The lens side terminals 14 include a second power supply terminal 46, a second ground terminal 47, a lens side signal terminal 48, and a lens side communication terminal 49. The second power supply terminal 46 is used for supplying power to the lens CPU 41. The lens side signal terminal 48 includes a third signal terminal 48a used for detecting the attachment of the interchangeable lens 10, and a fourth signal terminal 48b used for inputting a reset signal from the lens reset terminal LSRST of the camera CPU 21. The lens side communication terminal 49 includes a sixth communication terminal 49a, a seventh communication terminal 49b, an eighth communication terminal 49c, a ninth communication terminal 49d and a tenth communication terminal 49e. The lens side communication terminal 49 is used for mutual communication between the camera CPU 21 and the lens CPU 41.

Figure 4:
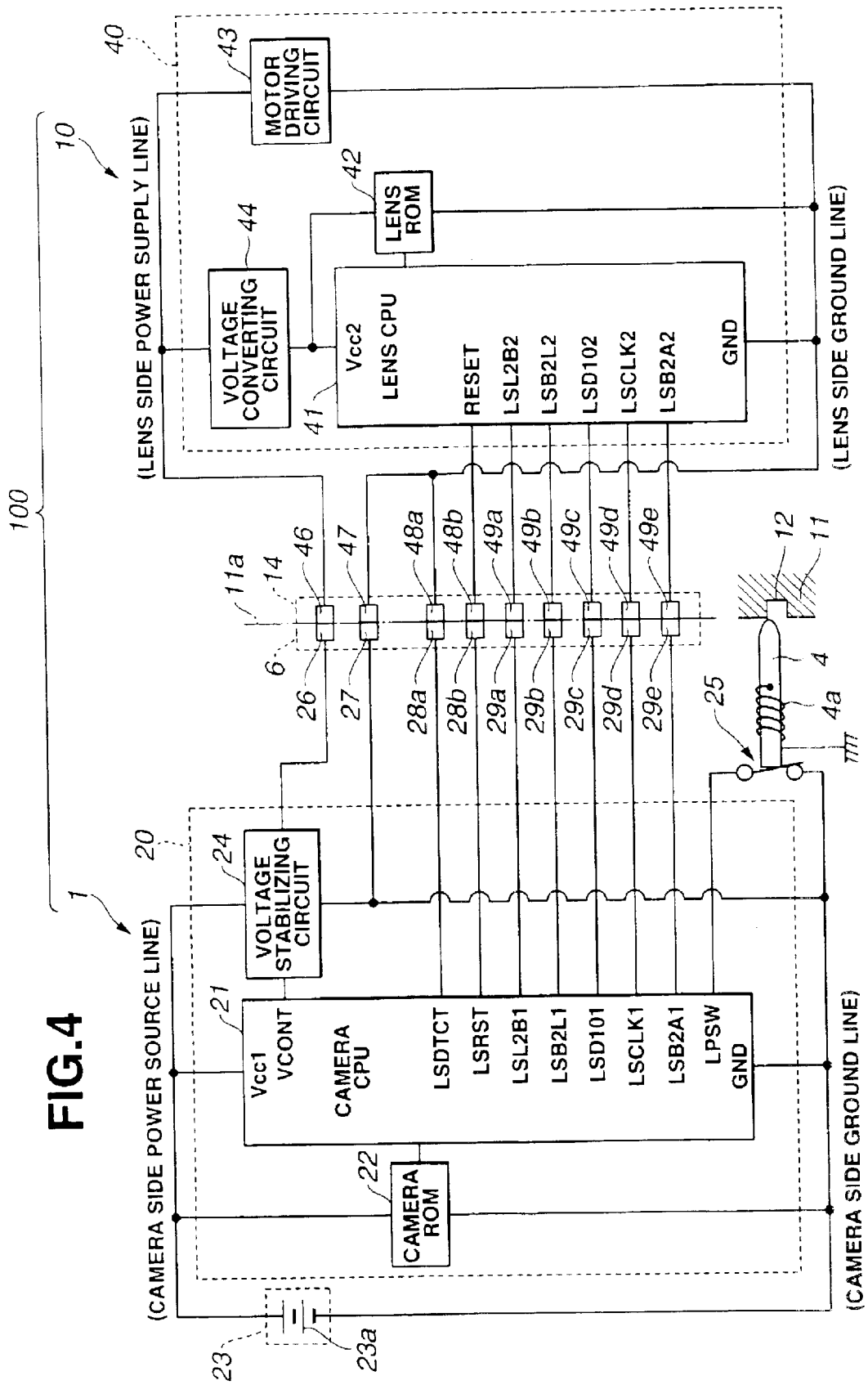
FIG. 4 is a block diagram showing the constructions of the camera body and interchangeable lens indicating the state immediately before an interlocking pin is fitted into an associating hole-in order to attach the interchangeable lens.
Figure 5:
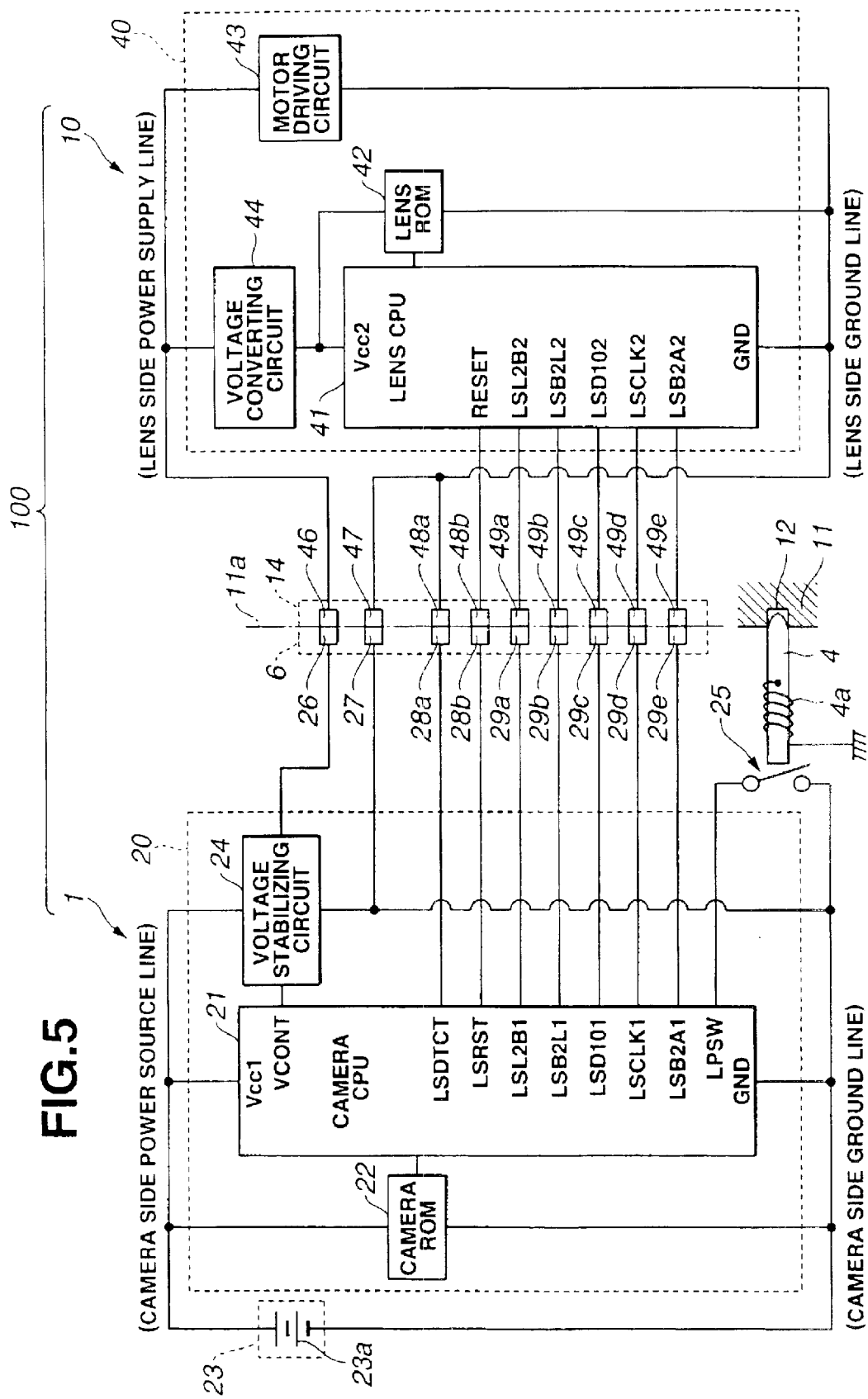
FIG. 5 is a block diagram showing the constructions of the camera body and interchangeable lens indicating the state after the interchangeable lens is attached and after an interlocking pin is fitted into an associating hole.

In the lens side terminals 14, the first power supply terminal 26, the first ground terminal 27, the camera side signal terminal 28 and the camera side communication terminal 29 are connected to the second power supply terminal 46, the second ground terminal 47, the lens side signal terminal 48 and the lens side communication terminal 49, respectively, as shown in FIGS. 4 and 5 described later when the interchangeable lens 10 is attached to the camera body 1.

The motor driving circuit 43 is connected between the lens side power supply line and the lens side ground line. The lens side power supply line is connected to the second power supply terminal 46. The lens side ground line is connected to the second ground terminal 47 and the third signal terminal 48a.

The terminal Vcc2 of the lens CPU 41 is connected to the lens side power supply line through the voltage converting circuit 44. The RESET terminal is connected to the fourth signal terminal 48b. The LSL2B2 terminal is connected to the sixth communication terminal 49a. The LSB2L2 terminal is connected to the seventh communication terminal 49b. The LSDIO2 terminal is connected to the eighth communication terminal 49c. The LSCLK2 terminal is connected to the ninth communication terminal 49d. The LSB2A2 terminal is connected to the tenth communication terminal 49e. The GND terminal is connected to the lens side ground line.

The lens ROM 42 is connected between the terminal Vcc2 of the lens CPU 41 and the lens side ground line. The output terminal of the lens ROM 42 is connected to the lens CPU 41.

The lens ROM 42 may be constituted by a non-volatile memory, for example, and stores data such as the lens type, lens ID, manufacturer ID, number of zooming divisions, open F number, and minimum F number of the interchangeable lens 10 as shown in Table 1 described later. The lens ROM 42 may be provided within the lens CPU 41.

The motor driving circuit 43 is a circuit for driving a motor, not shown, contained in the interchangeable lens 10. The motor driving circuit 43 moves multiple lenses 10a (see FIG. 1) for AF control toward the optical axis in order to have AF control perform.

The voltage converting circuit 44 includes a voltage regulator circuit, for example. The voltage converting circuit 44 converts power having been supplied from the voltage stabilizing circuit 24 of the camera body 1 so as to be supplied to the lens CPU 41 and supplies the converted power to the lens CPU 41 and lens ROM 42.

With the second electric circuit 40 having the above-described construction, power is supplied from the power supply circuit 23 (see FIG. 2) of the camera body 1 to the motor driving circuit 43 without through the voltage converting circuit 44. For the control of the lens CPU 41 and lens ROM 42, power is supplied through the voltage converting circuit 44.

Next, a method will be described for supplying power to the interchangeable lens 10 of an interchangeable lens type camera system 100 according to an embodiment of the invention by using the camera body 1 and the interchangeable lens 10 having the above-described construction.

Figure 6:
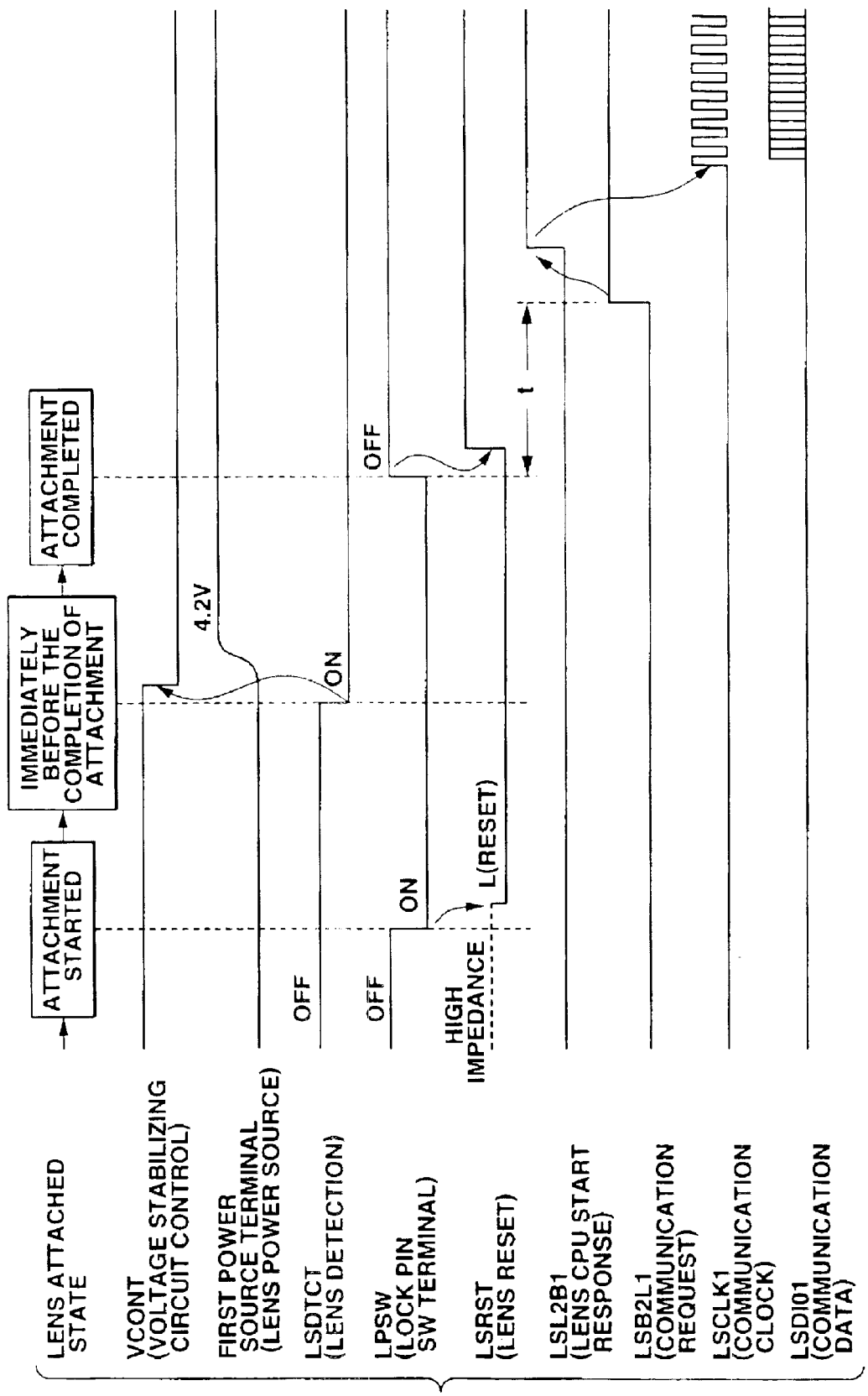
FIG. 6 is a timing chart showing an operation of a CPU of the camera body before and after an interchangeable lens is attached.

FIG. 4 is a block diagram showing a construction of an electric circuit of an interchangeable lens type camera system having the camera body 1 as shown in FIG. 2 and the interchangeable lens 10 as shown in FIG. 3, wherein the construction shows a state immediately before the interlocking pin 4 fits into the engaging hole 12 after the attachment of the interchangeable lens 10. FIG. 5 is a block diagram showing the construction of the electric circuit of the interchangeable lens type camera system, wherein the construction shows a state after the interlocking pin 4 fits into the engaging hole 12 after the attachment of the interchangeable lens 10. FIG. 6 is a timing chart showing an operation of the CPU 21 of the camera body 1 before and after the attachment of the interchangeable lens 10.

As shown in FIG. 6, the interchangeable lens type camera system 100 has the state of the start of the attachment of the interchangeable lens 10 to the camera body 1. That is, in a state that three Bayonet nails 13 (see FIG. 1) of the interchangeable lens 10 are engaged with the three Bayonet nail engaging portions 5 (see FIG. 1) of the camera body 1, and the interlocking pin 4 is pressed against the lens side mount portion 11 of the interchangeable lens 10, thus, the interlocking pin 4 is retracted into the camera side mount portion 2, the back end of the interlocking pin 4 presses the detection switch 25, as shown in FIG. 4. Then, the detection switch 25 is switched from OFF to ON, that is, from a first state to a second state. At the ON state, the lock pin switch terminal LPSW of the camera CPU 21 is switched from OFF to ON.

In response to the ON state of the LPSW, the camera CPU 21 outputs a LOW signal, which is a reset signal, from the lens reset terminal LSRST in High impedance state as shown in FIG. 6. Since the camera side terminals 6 have not been in contact with the lens side terminals 14 yet under this condition, the reset signal is not sent from the lens reset terminal LSRST to the lens CPU 41.

Next, in a state immediately before the completion of the attachment of the interchangeable lens 10, that is, the state such that the interchangeable lens 10 is slid and rotated in one direction, and the lens side mount portion 11 presses the interlocking pin 4 and rotates at the same time, and as shown in FIG. 4, the detection switch 25 is ON, and immediately before the interlocking pin 4 fits into the engaging hole 12, the camera side terminals 6 and the lens side terminals 14 are brought into contact. Here, since the second signal terminal 28b of the camera side terminals 6 and the fourth signal terminal 48b of the lens side terminals 14 are brought into contact, the reset signals continuously output from the lens reset terminal LSRST of the camera CPU 21 are input to the reset terminal RESET of the lens CPU 41. Therefore, the lens CPU 41 is reset.

When the first signal terminal 28a of the camera side terminals 6 and the third signal terminal 48a of the lens side terminals 14 are brought into contact, the first signal terminal 28a and the third signal terminal 48a are grounded (GND). When the GND state is detected through the lens detecting terminal LSDTCT of the camera CPU 21 connecting with the first signal terminal 28a, the camera CPU 21 outputs an operational signal to the voltage-stabilizing-circuit control terminal VCONT. Thus, working voltage of 4.2 V, for example, is started to be supplied from the power supply circuit 23 to the first power supply terminal 26 of the camera side terminals 6 connected to the terminal VCONT through the voltage stabilizing circuit 24. In other words, while the reset signals are being output to the lens CPU 41, power is supplied.

Next, when the interchangeable lens 10 has been attached to the camera body 1, three Bayonet nails 13 of the interchangeable lens 10 are engaged with the three Bayonet nail engaging portions 5. Thus, the interchangeable lens 10 is fixed to the camera body 1. As shown in FIG. 5, when the interlocking pin 4 fits into the engaging hole 12, the interlocking pin 4 extends into the engaging hole 12 because of the pressing spring 4a. Therefore, the detection switch 25 is switched from the second state to first state according to the invention, that is, from ON to OFF. As a result, the lock pin switch terminal LPSW of the camera CPU 21 is switched from ON to OFF as shown in FIG. 6.

In response to the OFF state of the lock pin switch terminal LPSW, the camera CPU 21 cancels the reset signals being output from the lens reset terminal LSRST after a timer, not shown, measures a predetermined period of time, which is set in view of the chattering time of the switch. In other words, the reset state of the lens CPU 41 is cancelled. Thus, the lens CPU 41 starts operating.

In this way, after the camera CPU 21 resets the lens CPU 41 according to this embodiment, power is supplied to the lens CPU 41.

Next, a method for identifying a manufacturer of the interchangeable lens 10 attached to the camera body 1 in the interchangeable lens type camera system 100 according to an embodiment of the invention will be described with reference to FIGS. 5 to 7 and Tables 1 and 2.

Figure 7:
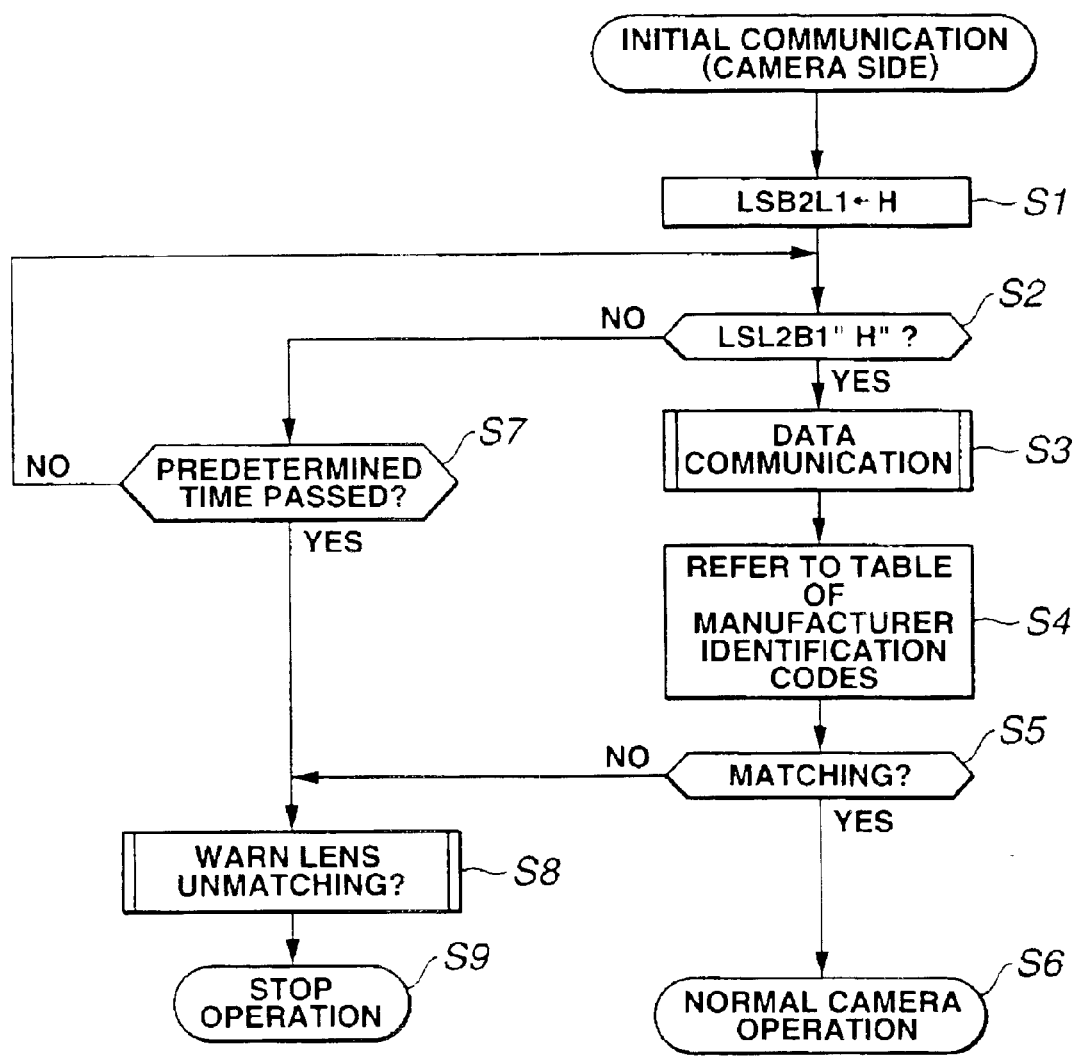
FIG. 7 is a flowchart showing an operation with respect to the CPU for authenticating an interchangeable lens after an interchangeable lens is attached to the camera body.

FIG. 7 is a flowchart showing an operation with respect to the CPU 21 when authenticating the interchangeable lens 10 in FIG. 3 after the interchangeable lens 10 is attached to the camera body 1 in FIG. 2. Table 1 is a table showing various kinds of data stored in the lens ROM 42 of the interchangeable lens 10 in FIG. 3. Table 2 is a table showing manufacturer IDs stored in the camera ROM 22 of the camera body 1 in FIG. 2.

TABLE 1

| TYPE OF DATA | CONTENTS | BYTE LENGTH |
| --- | --- | --- |
| LENS TYPE | Data identifying function of lens | 2 |
| LENS ID | Data for identifying machine type and data for identifying an | 6 |

TABLE 1-continued

| TYPE OF DATA | CONTENTS | BYTE LENGTH |
|---|---|---|
| MANUFACTURER ID | individual Data for identifying a manufacturer | 1 |
| NUMBER OF ZOOM DIVISIONS | Data indicating a number of divisions of a zoom encoder | 1 |
| OPEN F NO. | Open F number at each zooming position | 1 |
| MINIMUM F NO. | Minimum F number data at each zoom position | 1 |
| : | : | : |
| : | : | : |

TABLE 2

| MANUFACTURER ID | MANUFACTURERS |
|---|---|
| 01 | XXX CO., LTD. |
| 02 | ○○○ K.K. |
| 03 | ΔΔΔ CORPORATION |
| 04 | *** INDUSTRIES INC. |
| 05 | K.K. ●●● |
| : | : |
| : | : |
| : | : |

As shown in FIG. 7, at a step S1, first the camera CPU 21 cancels reset signals being output from the lens reset terminal LSRST (see FIG. 5). Then, after a predetermined time t from the completion of the attachment as shown in FIG. 6, a HIGH signal, which is a communication request signal, is output from the communication request terminal LSB2L1 to the lens CPU 41. Then, the processing goes to a step S2.

At the step S2, in response to the communication request signal output from the terminal LSB2L1 at the step S1, whether the start-of-lens-CPU responding terminal LSL2B1 of the camera CPU 21 is switched to the HIGH (H) level or not, that is, whether any response has been received or not is checked. More specifically, whether a starting signal output from the start-of-lens-CPU output terminal LSL2B2 of the lens CPU 41 is input to the terminal LSL2B1 or not is checked. If the terminal LSL2B1 is switched to the HIGH (H) level, the processing goes to a step S3. If the terminal LSL2B1 is not switched to the HIGH (H) level, the processing goes to a step S7.

At the step S7, in response to the output from the terminal LSB2L1, the time until the terminal LSL2B1 is switched to the HIGH (H) level is measured. If the time is shorter than a predetermined time, the processing returns to the step S2. If the time is longer than the predetermined time, the processing goes to a step S8.

At the step S2, when the terminal LSL2B1 is switched to the HIGH (H) level, the camera CPU 21 and the lens CPU 41 can communicate with each other. Therefore, at the step S3, data communication is performed between the camera CPU 21 and the lens CPU 41. The data communication is a so-called serial communication, which is generally known. Now, the data communication at the step S3 will be described. As shown in FIG. 6, a communication clock signal is output from the communication clock terminal LSCLK1 of the camera CPU 21. Then, communication data is output from the communication data terminal LSDIO1 to the lens CPU 41. In response to the output, the lens CPU 41 causes the communication data terminal LSDIO2 to output, to the communication data terminal LSDIO1 of the camera CPU 21, lens data such as the type of lens, lens ID, manufacturer ID, number of zooming divisions, open F No. and minimum F No., as shown in Table 1, which is stored in the lens ROM 42 (see FIG. 3).

The data stored in the lens ROM 42 as shown in Table 1 will be described below. The type of lens is data indicating a function of a lens. The lens ID is data for identifying the lens type and an individual. The manufacturer ID is data for identifying the manufacturer of a lens. The number of zooming divisions is data indicating a number of divisions of a zoom encoder of a lens. The open F No. is data indicating an open F number of a lens at each zoom position. The minimum F No. is data indicating the minimum F number of a lens at each zoom position. The byte length is a magnitude of data. The type of lens, lens ID, number of zoom divisions, open F No. and minimum F No. are used for a shooting operation.

Referring back to the flowchart shown in FIG. 7, different kinds of data are output from the lens CPU 41 to the communication data terminal LSDIO1 of the camera CPU 21. Then, the processing goes to a step S4.

At the step S4, the camera CPU 21 looks up the manufacturer ID of the various kinds of lens data input to the communication data terminal LSDIO1 in the manufacturer ID table as shown in Table 2 stored in the camera ROM 22 (see FIG. 2). Then, the processing goes to a step S5. The manufacturer ID table includes a list of manufacturers of interchangeable lenses, which are able to be controlled properly for camera operations by the camera CPU 21.

At the step S5, whether the manufacturer ID input by the lens ROM 42 is on the manufacturer ID table in the camera ROM 22 or not is checked (authenticated). If the input manufacturer ID is on the manufacturer ID table, the processing goes to a step S6. At the step S6, the camera CPU 21 of the camera body 1 controls the lens CPU 41 of the interchangeable lens 10 to perform a normal camera operation. On the other hand, if the input manufacturer rD is not on the manufacturer ID table, the processing goes to a step S8.

At the step SB, if the lens CPU 41 does not respond to the communication request from the camera CPU 21 at the step S7, or if the manufacturer ID output from the lens ROM 42 is not on the manufacturer ID table within the camera ROM 22, a warning indicating the lens incompliance is displayed on a display apparatus such as an LCD, not shown, of the camera body 1 under the control of the camera CPU 21. Thus, the fact that the interchangeable lens attached by a user cannot be used in the camera body 1 is informed. The lens incompatibility warning may be given through BEEP sounds from the camera body. After that, the processing goes to a step S9. At the step S9, the operation of the camera body 1 is terminated.

As described above, with the interchangeable lens type camera system and camera control method in the interchangeable lens type camera system according to the embodiments of the invention, the manufacturer ID code stored in the lens ROM 42 is read through the mutual communication between the camera body 1 and the interchangeable lens 10. Then, whether the attached interchangeable lens is the proper interchangeable lens or not is checked and is authenticated with reference to the manufacturer ID table stored in the camera ROM 22. If proper as a result of the check, the camera operation can be performed.

Furthermore, the lens CPU 41 can be reset securely when the camera CPU 21 of the camera body 1 detects ON of the detection switch 25 using the interlocking pin 4, as described above. After that, power can be supplied from the camera body 1 to the lens CPU 41.

Thus, when an interchangeable lens is attached to the camera body, the problems of the lens cpu 41 due to the voltage instability immediately after powered on can be prevented. Furthermore, improper operations of an interchangeable lens due to the attachment of an incompliant interchangeable lens can be prevented.

Having described the preferred embodiments of the invention referring to the accompanying drawings, it should be understood that the present invention is not limited to those precise embodiments and various changes and modifications thereof could be made by one skilled in the are without departing from the spirit or scope of the invention as defined in the appended claims.

What is claimed is:

1. An interchangeable lens type camera system comprising:
   a camera body; and
   an interchangeable lens removably attached to the camera body;
   wherein the camera body comprises:
      a first CPU for controlling a shooting operation by the camera,
      an interlocking pin mounted at a camera side mount and adapted to move in interlocking with an operation for attaching the interchangeable lens, and
      a detection switch connected to the first CPU, wherein the detection switch is switched from a first state to a second state due to movement of the interlocking pin in response to a start of attachment of the interchangeable lens, and is switched back from the second state to the first state in response to completion of the attachment of the interchangeable lens;
   wherein the interchangeable lens comprises a second CPU for controlling lens operations, and
   wherein the first CPU supplies reset signals to the second CPU in response to the switching of the detection switch from the first state to the second state when the interchangeable lens is attached to the camera body, and cancels the reset signals in response to the switching of the detection switch from the second state to the first state.

2. An interchangeable lens type camera system comprising:
   a camera body; and
   an interchangeable lens removably attached to the camera body:
   wherein the camera body comprises:
      power supply means including a power supply battery;
      a first electric circuit including a first CPU for receiving a supply of power through a power supply line and ground line connected to the power supply means;
      power supplying means for supplying power from the power supply means to the interchangeable lens under control of the first CPU;
      attachment completion detecting means for detecting completion of attachment of the interchangeable lens and for outputting an attachment completion signal to the first CPU; and
      camera side terminals located near a mount portion of the interchangeable lens, wherein the camera side terminals comprise multiple contact terminals including a first power supply terminal connected to the power supplying means, a first ground terminal connected to the ground line, and a first signal terminal and second signal terminal connected to a signal input port of the first CPU;
   wherein the interchangeable lens comprises:
      a second electric circuit including a second CPU; and
      interchangeable lens side terminals abutted to the camera side terminals when the interchangeable lens is attached to the camera body, wherein the interchangeable lens side terminals include (i) multiple contact terminals comprising a second power supply terminal connected to a power supply line of the second electric circuit and abutted to the first power supply terminal; (ii) a second ground terminal connected to a ground line of the second electric circuit and abutted to the first ground terminal; (iii) a third signal terminal connected to the ground line of the second electric circuit and abutted to the first signal terminal immediately before the completion of the attachment of the interchangeable lens; and (iv) a fourth signal terminal connected to a reset terminal of the second CPU and abutted to the second signal terminal, and wherein the interchangeable lens side terminals are abutted respectively to the camera side terminals when the interchangeable lens is attached to the camera body, and
   wherein the first CPU supplies reset signals to the second CPU through a signal output port and the second signal terminal, activates the power supplying means when the signal input port is connected to the ground line of the second electric circuit through the first and third signal terminals, and cancels the reset signals when the attachment completion signal is received from the attachment completion detecting means.

3. An interchangeable lens type camera system according to claim 2, wherein the camera body further comprises attachment start detecting means for detecting a start of the attachment of the interchangeable lens and outputting an attachment start signal, and wherein the first CPU outputs the reset signal when the first CPU receives the attachment start signal.

4. An interchangeable lens type camera system, comprising:
   a camera body;
   an interchangeable lens removably attached to the camera body;
   first electric circuit means including a first CPU provided in the camera body;
   second electric circuit means provided in the interchangeable lens and including a second CPU which operates when power is supplied from the camera body;
   contact terminal means including first detecting means for detecting a change in potential of a specific contact terminal of multiple contact terminals provided in a connecting part of the camera body and the interchangeable lens and for detecting attachment of the interchangeable lens to the camera body, and second detecting means for detecting completion of the attachment of the interchangeable lens, after the detection by the first detecting means, based on a position of a member interlocking to an operation for attaching the interchangeable lens, and for detecting the attachment of the interchangeable lens to the camera body, wherein the contact terminal means electrically connect the first electric circuit means and the second electric circuit means when the interchangeable lens is attached to the camera body; and power supplying means provided in the camera body, for supplying the power to the second electric circuit means, wherein the first CPU holds the second CPU at a reset state and starts operations of the power supplying means in response to a detection result by the first detecting means and then cancels reset of the second CPU in response to a detection result by the second detecting means.

5. An interchangeable lens type camera system according to claim 4, further comprising:

a first memory which is one of contained in and connected to the first CPU for storing manufacturer identification codes of multiple interchangeable lens manufacturers, and a second memory which is one of contained in and connected to the second CPU for storing a manufacturer identification code for specifying a manufacturer of the interchangeable lens, wherein the first CPU communicates with the second CPU after canceling the reset of the second CPU to receive the manufacturer identification code stored in the second memory and to compare the received manufacturer identification code and multiple manufacturer identification codes stored in the first memory, and then checks whether the interchangeable lens is compliant with the camera body.

6. An interchangeable lens type camera system according to claim 5, wherein the first CPU permits subsequent camera operations when the first CPU determines that the interchangeable lens is compliant with the camera body.

7. A lens replacement camera system comprising:

a camera body; and an interchangeable lens removably attached to the camera body;

wherein the camera body comprises:

a power supply circuit;

a first electric circuit including a first CPU, a voltage stabilizing circuit for stabilizing voltage of the power supply circuit under control of the first CPU, and a first memory connected to the first CPU for storing multiple manufacturer codes for identifying manufacturers of interchangeable lenses;

an interlocking pin provided in a mount portion for mounting the interchangeable lens, and adapted to move in interlocking with an operation for attaching the interchangeable lens;

a detection switch connected to the first CPU, wherein the detection switch is switched from a first state to a second state due to movement of the interlocking pin in response to a start of attachment of the interchangeable lens, and is switched from the second state to the first state due to movement of the interlocking pin in response to completion of the attachment of the interchangeable lens; and camera side terminals located near the mount portion, wherein the camera side terminals comprise multiple contact terminals including a first power supply terminal connected to an output terminal of the voltage stabilizing circuit, a first ground terminal connected to a ground line, a first signal terminal connected to a signal input port of the first CPU, a second signal terminal connected to a signal output port of the first CPU, and first to fifth communication terminals connected respectively to communication ports of the first CPU;

wherein the interchangeable lens comprises:

a second CPU;

a second electric circuit including a second memory connected to the second CPU for storing a manufacturer identification code indicating at least manufacturers; and interchangeable lens side terminals located near a mount portion, wherein the interchangeable lens side terminals comprise multiple contact terminals and including a second power supply terminal abutted to the first power supply terminal when the interchangeable lens is attached to the camera body, for connecting a power supply of the camera side to a power supply line of the second electric circuit, a second ground terminal connected to the ground line of the second electric circuit and abutted to the first ground terminal when the interchangeable lens is attached to the camera body, a third signal terminal connected to the ground line of the second electric circuit and abutted to the first signal terminal when the interchangeable lens is attached to the camera body before the detection of the attachment completion by the detection switch, a fourth signal terminal connected to a reset terminal of the second CPU and abutted to the second signal terminal when the interchangeable lens is attached to the camera body, and sixth to tenth communication terminals connected to a communication terminal of the second CPU and abutted respectively to the first to fifth communication terminals, when the interchangeable lens is attached to the camera body, and wherein the first CPU further comprises:

supplying means for supplying reset signals to the second CPU through the signal output port and the second signal terminal in response to the switching of the detection switch from the first state to the second state;

power supplying starting means for starting supplying power from the voltage stabilizing circuit to the interchangeable lens side when a signal input port is connected to the ground line of the second electric circuit through the first and third signal terminals;

canceling means for canceling the reset signals in response to the switching of the detection switch from the second state to the first state;

reading means for reading the manufacturer identification code of the interchangeable lens stored in the second memory by communicating with the second CPU through the first to fifth communication terminals and the sixth to tenth communication terminals;

checking means for checking whether the read manufacturer identification code matches with one of the multiple manufacturer identification codes stored in the first memory; and changing means for changing subsequent camera operations in response to a checking result by the checking means.

8. A camera in an interchangeable lens type camera system, comprising:

a CPU provided in a camera side;

power supplying means for supplying power to a lens side CPU under control of the camera side CPU;

detecting means for detecting completion of attachment of an interchangeable lens based on a position of a member moving in interlocking with an operation for attaching the interchangeable lens; and multiple camera side terminals abutted to multiple contact terminals of the interchangeable lens side when mounting an interchangeable lens, including: a power supply terminal connected to the power supplying means, for supplying power to the lens side CPU; a ground terminal; a first signal terminal connected to a signal input port of the camera side CPU, for detecting an attaching state of the interchangeable lens, and connected to a ground line within the interchangeable lens when the interchangeable lens has been completely attached; and a second signal terminal connected to a signal output port of the camera side CPU, for supplying reset signals to the lens side CPU;

wherein the camera side CPU activates the power supplying means by keeping the lens side CPU in a reset state when the signal input port obtains a ground potential and then cancels the reset state of the lens side CPU in response to the detection of the attachment completion by the detecting means.

9. A camera in an interchangeable lens type camera system, comprising:

first detecting means for detecting completion of attachment of an interchangeable lens by determining a state of the attachment of the interchangeable lens in accordance with a presence or absence of an electric connection between an electric circuit in the camera and an electric circuit in the interchangeable lens;

second detecting means for detecting the completion of the attachment of the interchangeable lens in later timing than the detection of the first detecting means, by determining the state of the attachment of the interchangeable lens in accordance with a position of a member in connection with an operation for attaching the interchangeable lens;

reset means for setting the CPU in a reset state until the completion of the attachment of the interchangeable lens is detected by the second detecting means and for canceling the reset state when the completion of the attachment of the interchangeable lens is detected by the second detecting means; and power supplying means for supplying power to the interchangeable lens by starting power supply to the interchangeable lens when the completion of the attachment of the interchangeable lens is detected by the first detecting means while the CPU is being kept at the reset state by the reset means.

10. An interchangeable lens in an interchangeable lens type camera system wherein the interchangeable lens is attachable to a camera body and is operated by power supplied from a side of the camera system, said interchangeable lens comprising:

a CPU which controls operation of the interchangeable lens; and a memory for storing a manufacturer identification code for specifying a manufacturer of the interchangeable lens;

wherein the CPU is reset before the power is supplied from the camera body side, the reset is canceled after the power has beaun to be supplied iron the camera body side, and the manufacturer identification code is then read from the memory and transmitted to the camera body.

11. A method for controlling a camera to which an interchangeable lens including a CPU is removably attached, the method comprising:

detecting a start of attachment of the interchangeable lens and supplying reset signals to the CPU within the interchangeable lens;

detecting a time immediately before completion of the attachment of the interchangeable lens and starting power supplying to the CPU;

detecting the completion of the attachment of the interchangeable lens and canceling the reset signals supplied to the CPU;

communicating with the interchangeable lens and receiving a manufacturer identification code of the interchangeable lens from an interchangeable lens side; and comparing the received manufacturer identification code and multiple identification codes prepared in the camera and checking whether the received manufacturer identification code matches with one of the prepared multiple manufacturer identification codes.

12. The method for controlling a camera according to claim 11, wherein a subsequent camera operation is performed if the received manufacturer identification code matches with one of the multiple manufacturer identification codes.

13. The method for controlling a camera according to claim 11, wherein a warning operation is implemented if the received manufacturer identification code does not match with any of the multiple manufacturer identification codes.

14. The method for controlling a camera according to claim 11, wherein a camera operation is terminated if the received manufacturer identification code does not match with any of the multiple manufacturer identification codes.

* * * * *